United States Patent
Ucasz

(10) Patent No.: US 11,261,742 B2
(45) Date of Patent: Mar. 1, 2022

(54) ARTICLE HAVING VARIABLE COMPOSITION COATING

(71) Applicant: United Technologies Corporation, Farmington, CT (US)

(72) Inventor: Mark T. Ucasz, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 767 days.

(21) Appl. No.: 15/036,938

(22) PCT Filed: Nov. 17, 2014

(86) PCT No.: PCT/US2014/065863
§ 371 (c)(1),
(2) Date: May 16, 2016

(87) PCT Pub. No.: WO2015/077163
PCT Pub. Date: May 28, 2015

(65) Prior Publication Data
US 2016/0281514 A1 Sep. 29, 2016

Related U.S. Application Data

(60) Provisional application No. 61/905,937, filed on Nov. 19, 2013.

(51) Int. Cl.
*F01D 5/28* (2006.01)
*C23C 30/00* (2006.01)
(Continued)

(52) U.S. Cl.
CPC ............ *F01D 5/288* (2013.01); *C23C 28/028* (2013.01); *C23C 28/048* (2013.01);
(Continued)

(58) Field of Classification Search
CPC . C23C 24/04; C23C 28/3215; C23C 28/3455; Y02E 20/16
(Continued)

(56) References Cited

U.S. PATENT DOCUMENTS 2,431,660 A 11/1947 Gaudenzi
2,676,114 A * 4/1954 Barkley ................ C23C 14/044
427/248.1

(Continued)

FOREIGN PATENT DOCUMENTS

EP 0139396 5/1985
EP 1426458 6/2004
(Continued)

OTHER PUBLICATIONS

Supplementary European Search Report for European Patent Application No. 14864432 completed Jun. 27, 2017.
(Continued)

*Primary Examiner* — J. Todd Newton, Esq.
(74) *Attorney, Agent, or Firm* — Carlson, Gaskey & Olds, P.C.

(57) ABSTRACT

A coated article includes a substrate and an MCrAlY coating supported on the substrate. The M includes at least one of nickel, cobalt, and iron, Cr is chromium, Al is aluminum, and Y is yttrium. The composition of the MCrAlY coating varies in an amount of at least one of Cr, Al, and Y by location on the substrate with respect to localized property requirements. In one example, the coated article is an article of a gas turbine engine.

24 Claims, 1 Drawing Sheet

(51) Int. Cl.

| | | |
|---|---|---|
| *C23C 28/04* | (2006.01) | |
| *C23C 28/00* | (2006.01) | |
| *C23C 28/02* | (2006.01) | |
| *F01D 5/02* | (2006.01) | |
| *F01D 9/04* | (2006.01) | |
| *F01D 11/08* | (2006.01) | |
| *F01D 25/00* | (2006.01) | |

(52) U.S. Cl.
CPC ........ *C23C 28/3215* (2013.01); *C23C 28/345* (2013.01); *C23C 30/00* (2013.01); *F01D 5/02* (2013.01); *F01D 9/041* (2013.01); *F01D 11/08* (2013.01); *F01D 25/007* (2013.01); *F05D 2220/32* (2013.01); *F05D 2230/90* (2013.01); *F05D 2240/35* (2013.01); *F05D 2260/95* (2013.01); *F05D 2300/171* (2013.01); *F05D 2300/177* (2013.01); *F05D 2300/611* (2013.01); *Y02T 50/60* (2013.01)

(58) Field of Classification Search
USPC .......................... 427/419.1, 180, 201, 383.1
See application file for complete search history.

(56) References Cited

U.S. PATENT DOCUMENTS

| | | | | |
|---|---|---|---|---|
| 3,542,530 | A * | 11/1970 | Grafwallner | C22C 38/18 |
| | | | | 428/667 |
| 3,676,085 | A * | 7/1972 | Evans et al. | C22C 19/07 |
| | | | | 428/668 |
| 3,754,903 | A * | 8/1973 | Goward | C22C 19/007 |
| | | | | 420/443 |
| 3,918,139 | A * | 11/1975 | Felten | C22C 19/00 |
| | | | | 428/655 |
| 3,928,026 | A * | 12/1975 | Hecht | C22C 19/052 |
| | | | | 428/615 |
| 3,993,454 | A * | 11/1976 | Giggins, Jr. | C22C 19/05 |
| | | | | 428/553 |
| 4,237,193 | A * | 12/1980 | Jackson | C23C 28/023 |
| | | | | 148/404 |
| 4,246,323 | A * | 1/1981 | Bornstein | C23C 4/18 |
| | | | | 148/518 |
| 4,532,191 | A * | 7/1985 | Humphries | C23C 24/106 |
| | | | | 427/451 |
| 4,585,481 | A * | 4/1986 | Gupta | C22C 19/058 |
| | | | | 106/14.05 |
| 4,968,117 | A * | 11/1990 | Chern | B01J 12/02 |
| | | | | 359/573 |
| 5,087,477 | A | 2/1992 | Giggins, Jr. et al. | |
| 5,262,245 | A | 11/1993 | Ulion et al. | |
| 5,302,414 | A * | 4/1994 | Alkhimov | B05B 7/144 |
| | | | | 427/191 |
| 5,500,252 | A * | 3/1996 | Meelu | C23C 10/58 |
| | | | | 427/376.3 |
| 5,601,652 | A | 2/1997 | Mullin et al. | |
| 5,932,078 | A | 8/1999 | Beers et al. | |
| 5,972,185 | A | 10/1999 | Hendricks et al. | |
| 6,009,829 | A | 1/2000 | Ramalingam | |
| 6,036,828 | A | 3/2000 | Beers et al. | |
| 6,060,174 | A | 5/2000 | Sabol et al. | |
| 6,095,755 | A | 8/2000 | Houston | |
| 6,117,560 | A | 9/2000 | Maloney | |
| 6,177,200 | B1 | 1/2001 | Maloney | |
| 6,203,847 | B1 | 3/2001 | Conner et al. | |
| 6,224,726 | B1 | 5/2001 | Beers et al. | |
| 6,231,991 | B1 | 5/2001 | Maloney | |
| 6,270,852 | B1 * | 8/2001 | Ulion | C23C 28/3215 |
| | | | | 427/142 |
| 6,284,323 | B1 | 9/2001 | Maloney | |
| 6,358,002 | B1 | 3/2002 | Good et al. | |
| 6,435,830 | B1 | 8/2002 | Allen et al. | |
| 6,503,575 | B1 * | 1/2003 | Payne | C23C 4/02 |
| | | | | 427/447 |
| 6,869,703 | B1 * | 3/2005 | Spitsberg | C04B 35/486 |
| | | | | 416/241 B |
| 6,916,561 | B1 * | 7/2005 | Spitsberg | C23C 14/08 |
| | | | | 416/241 B |
| 6,933,060 | B2 * | 8/2005 | Subramanian | C23C 14/083 |
| | | | | 428/632 |
| 7,597,966 | B2 * | 10/2009 | Spitsberg | C23C 28/321 |
| | | | | 416/241 B |
| 8,497,028 | B1 | 7/2013 | Tryon et al. | |
| 2001/0012568 | A1 | 8/2001 | Bose et al. | |
| 2002/0102360 | A1 * | 8/2002 | Subramanian | C23C 24/04 |
| | | | | 427/419.1 |
| 2002/0185198 | A1 * | 12/2002 | Pietruska | B23P 6/007 |
| | | | | 148/528 |
| 2006/0233951 | A1 * | 10/2006 | DeBiccari | C23C 24/04 |
| | | | | 427/180 |
| 2007/0003416 | A1 * | 1/2007 | Bewlay | B22F 5/009 |
| | | | | 416/241 B |
| 2007/0141369 | A1 * | 6/2007 | Hazel | C23C 4/04 |
| | | | | 428/469 |
| 2008/0038575 | A1 * | 2/2008 | Renteria | C23C 24/04 |
| | | | | 428/548 |
| 2009/0191422 | A1 | 7/2009 | Tryon et al. | |
| 2009/0263237 | A1 | 10/2009 | Box | |
| 2011/0171488 | A1 * | 7/2011 | Taylor | C23C 28/00 |
| | | | | 428/623 |
| 2012/0189778 | A1 | 7/2012 | Riewe et al. | |
| 2012/0213928 | A1 * | 8/2012 | Wang | C23C 10/06 |
| | | | | 427/250 |
| 2013/0095340 | A1 * | 4/2013 | Sivakumar | C23C 4/02 |
| | | | | 428/548 |
| 2014/0287149 | A1 * | 9/2014 | Zimmermann | C23C 4/02 |
| | | | | 427/446 |
| 2015/0137404 | A1 * | 5/2015 | Tuchinskiy | B32B 15/04 |
| | | | | 264/46.1 |
| 2018/0320270 | A1 * | 11/2018 | Nardi | C23C 24/04 |

FOREIGN PATENT DOCUMENTS

| | | |
|---|---|---|
| EP | 1428982 | 6/2004 |
| EP | 2354454 | 8/2011 |
| EP | 2857546 | 4/2015 |
| GB | 2046369 | 11/1980 |
| WO | 02061177 | 8/2002 |

OTHER PUBLICATIONS

The International Preliminary Report on Patentability for PCT Application No. PCT/US2014/065863, dated Jun. 2, 2016.
International Search Report and The Written Opinion for PCT Application No. PCT/US2014/065863 dated Feb. 26, 2015.

* cited by examiner

ARTICLE HAVING VARIABLE COMPOSITION COATING

CROSS-REFERENCE TO RELATED APPLICATION

This application claims priority to U.S. Provisional Application No. 61/905,937, filed Nov. 19, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines. Airfoils in the engine can be coated with a ceramic thermal barrier coating to protect the airfoils from the high-temperature gas flow.

SUMMARY

A coated article according to an example of the present disclosure includes a substrate, an MCrAlY coating supported on the substrate, where the M includes at least one of nickel, cobalt, and iron, Cr is chromium, Al is aluminum, and Y is yttrium. The composition of the MCrAlY coating varies in an amount of at least one of Cr, Al, and Y by location on the substrate and with respect to localized property requirements.

In a further embodiment of any of the foregoing embodiments, the localized property requirements are selected from the group consisting of corrosion resistance, erosion resistance, spallation resistance, fatigue resistance, oxidation resistance, creep resistance, impact resistance, and combinations thereof.

In a further embodiment of any of the foregoing embodiments, the composition of the MCrAlY coating varies in the amount of Cr.

In a further embodiment of any of the foregoing embodiments, the composition of the MCrAlY coating varies in the amount of Al.

In a further embodiment of any of the foregoing embodiments, the composition of the MCrAlY coating varies in the amount of Y.

In a further embodiment of any of the foregoing embodiments, the MCrAlY coating includes at least one alloying element of Co, tantalum (Ta), tungsten (W), molybdenum (Mo), silicon (Si), hafnium (Hf), and zirconium (Zr), and the amount of the alloying element differs by location on the substrate and with respect to localized property requirements.

In a further embodiment of any of the foregoing embodiments, the MCrAlY coating includes at least one alloying element of tantalum (Ta), tungsten (W), molybdenum (Mo), and zirconium (Zr), and the amount of the alloying element differs by location on the substrate and with respect to localized property requirements such that the MCrAlY includes at least one of Ta, W, Mo, and Zr at a first location on the substrate and the MCrAlY coating is free of any Ta, W, Mo, and Zr at a second location on the substrate.

In a further embodiment of any of the foregoing embodiments, the substrate is an airfoil, and the composition of the MCrAlY coating varies between a leading edge of the airfoil and another location on the airfoil to provide better erosion resistance at the leading edge relative to the other location on the airfoil.

In a further embodiment of any of the foregoing embodiments, the MCrAlY coating is functionally graded between locations that vary in composition.

In a further embodiment of any of the foregoing embodiments, the MCrAlY coating is a continuous coating.

A gas turbine engine according to an example of the present disclosure includes an article having a substrate and an MCrAlY coating supported on the substrate, where the M includes at least one of nickel, cobalt, and iron, Cr is chromium, Al is aluminum, and Y is yttrium. The composition of the MCrAlY coating varies in at least one of Cr, Al, and Y by location on the substrate with respect to localized property requirements.

The gas turbine engine as recited in claim 11, including a compressor section, a combustor in fluid communication with the compressor section, and a turbine section in fluid communication with the combustor.

In a further embodiment of any of the foregoing embodiments, the localized property requirements are selected from the group consisting of corrosion resistance, erosion resistance, spallation resistance, fatigue resistance, oxidation resistance, creep resistance, impact resistance, and combinations thereof.

In a further embodiment of any of the foregoing embodiments, the composition of the MCrAlY coating varies in the amount of Cr.

In a further embodiment of any of the foregoing embodiments, the composition of the MCrAlY coating varies in the amount of Al.

In a further embodiment of any of the foregoing embodiments, the composition of the MCrAlY coating varies in the amount of Y.

In a further embodiment of any of the foregoing embodiments, the MCrAlY coating includes at least one alloying element of Co, tantalum (Ta), tungsten (W), molybdenum (Mo), silicon (Si), hafnium (Hf), and zirconium (Zr), and the amount of the alloying element differs by location on the substrate and with respect to localized property requirements.

In a further embodiment of any of the foregoing embodiments, the MCrAlY coating includes at least one alloying element of tantalum (Ta), tungsten (W), molybdenum (Mo), and zirconium (Zr), and the amount of the alloying element differs by location on the substrate and with respect to localized property requirements such that the MCrAlY includes at least one of Ta, W, Mo, and Zr at a first location on the substrate and the MCrAlY coating is free of any Ta, W, Mo, and Zr at a second location on the substrate.

In a further embodiment of any of the foregoing embodiments, the substrate is an airfoil in a turbine section of the engine, and the composition of the MCrAlY coating varies between a leading edge of the airfoil and another location on the airfoil to provide better erosion resistance at the leading edge relative to the other location on the airfoil.

In a further embodiment of any of the foregoing embodiments, the MCrAlY coating is functionally graded between locations that vary in composition.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
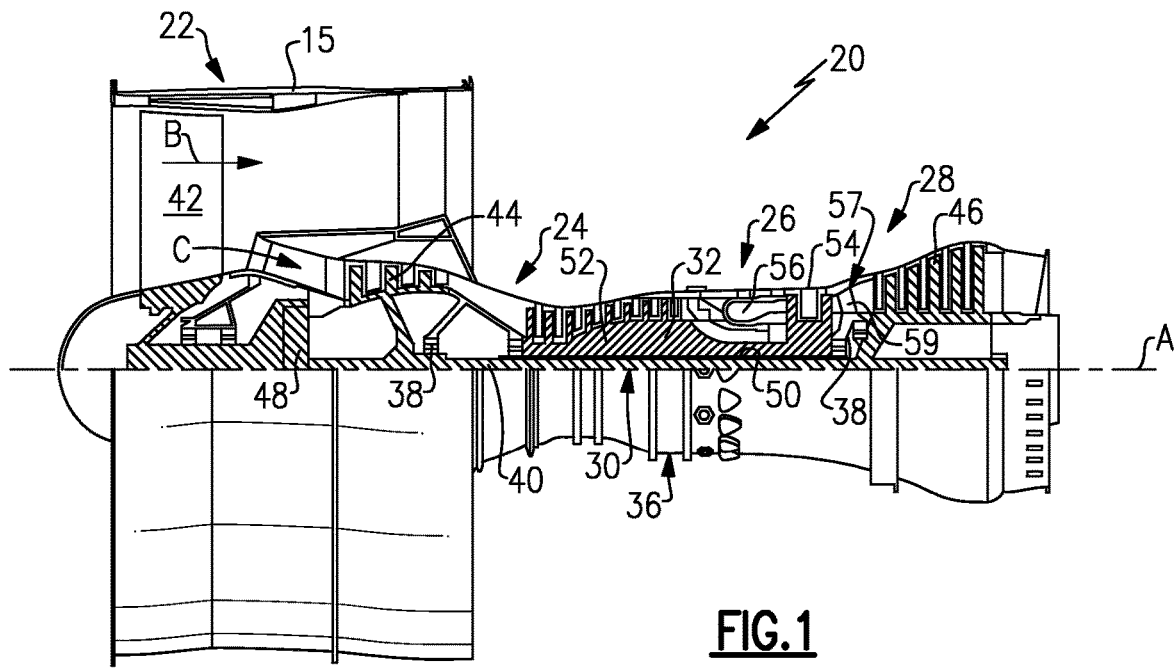
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
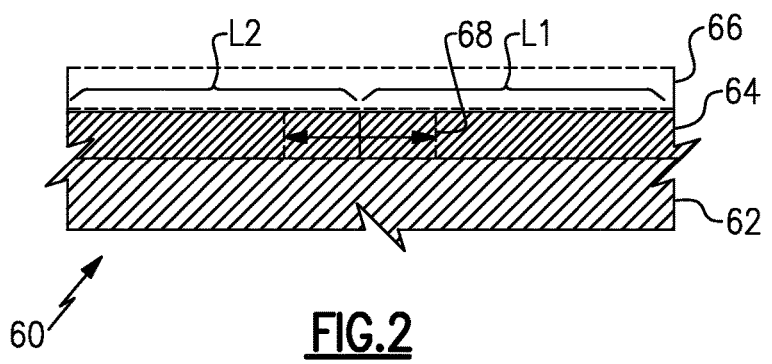
FIG. 2 illustrates a representative portion of a coated article that can be used in the gas turbine engine of FIG. 1.

FIG. 2 illustrates a representative portion of a coated article 60 that can be used in the gas turbine engine 20. For example, the article 60 can be an airfoil, such as a blade or vane, a blade outer air seal, a rotor disk, or other article that would benefit from the examples disclosed herein. The article 60 includes a substrate 62 and an MCrAlY coating 64, which can also include MCrAlYX, where X is additional alloying elements, supported on the substrate 62. The M is a metal and includes at least one of nickel (Ni), cobalt (Co), and iron (Fe), Cr is chromium, Al is aluminum, and Y is yttrium. In one example, the MCrAlY coating 64 is a continuous coating on the substrate 62.

The substrate 62 can be a structural body of the article or an intermediate coating that is between the MCrAlY coating 64 and a structural body of the article, for example. Example substrates can be nickel-based alloys, iron-nickel-based alloys, cobalt-based alloys, molybdenum-based alloys and niobium-based alloys, but are not limited to these.

The composition of the MCrAlY coating 64 varies in an amount of at least one of the Cr, Al, and Y by location on the substrate 62 with respect to localized property requirements. For example, as shown in FIG. 2, the MCrAlY coating 64 has a first composition at a first location L1 and a second, different composition at a second location L2 with respect to the amount of at least one of the Cr, Al, and Y. In further examples, the amounts of additional alloy elements can also vary with respect to localized property requirements. The additional alloy elements can include Co, tantalum (Ta), tungsten (W), molybdenum (Mo), silicon (Si), hafnium (Hf), zirconium (Zr), and combinations thereof.

The composition of the MCrAlY coating 64 varies by location to tailor the properties of the MCrAlY coating 64 with respect to localized property requirements. For example, the article 60 can have different requirements for oxidation, corrosion, erosion, spallation resistance, creep, fatigue, impact resistance, or combinations thereof that depend on location on the article 60. By varying the composition between different locations on the article 60, the localized property requirements can be tailored to the particular locations and thus can enhance durability of the article 60.

In further examples, varying the amount of Cr influences corrosion resistance and spallation resistance. For instance, greater amounts of Cr can provide higher resistance to corrosion and spallation. The Cr can also increase hot corrosion resistance, improve oxidation resistance and reduces Al requirement for formation of an alumina scale. An excess amount of Cr can lower creep strength.

Varying the amount of Al can influence bonding with an optional ceramic-based thermal barrier overcoat, represented at 66. For instance, the Al oxidizes and forms an alumina scale that facilitates strong bonding with the overcoat 66. Greater amounts of Al can provide a more robust scale for better bonding with the overcoat 66 and also improvement of oxidation resistance.

Varying the amount of Y influences oxidation and corrosion resistance. For instance, greater amounts of Y can provide higher resistance to oxidation and corrosion. Thus, by varying the amounts of at least one of Cr, Al, and Y, the properties of the MCrAlY coating 64 can be tailored with respect to localized property requirements.

Varying the amount of Ta, Mo and W reduces diffusivity of aluminum to the surface of the coating 64, which slows oxide growth rate and enhances oxidation resistance. The Ta can also be used to increase strength, increase oxidation strength and improve resistance to hot corrosion.

The Ta, Mo and W can also be added to provide a closer compositional match to an underlying alloy of the substrate 62. In one example, the underlying alloy of the substrate 62 can have a nominal composition, by weight, of 5% Cr, 10% Co, 5.65% Al, 1.9% Mo, 5.9% W, 8.7% Ta, 0.10% Hf, 3.0% Re and remainder Ni. Using a similar composition between substrate 62 and the coating 64 facilitates a reduction in interdiffusion of Ta, Mo and W, and thus increases oxidation life.

Relatively higher amounts of Si can increase oxidation resistance and type II hot corrosion resistance. Using excess Si can reduce the melting point of the coating 64 and potentially also of an underlying substrate nickel alloy.

Relatively higher amounts of Hf and Zr can increase adherence of alumina and chromia scales, and reduce spallation of overlying ceramic thermal barrier coating layers during thermal cycling. The Hf and Zr may also combine with sulfur and prevent sulfur from segregating to the oxide layer.

Relatively higher amounts of Co can increase microstructural strength and provide stability (reduces creep).

In a further example, the MCrAlY coating 64 can have a functionally graded region 68 (laterally graded) between the first location L1 and the second location L2. The functionally graded region 66 is a compositional transition from the composition of the MCrAlY coating 64 in the first location L1 to the composition of the MCrAlY coating 64 in the second location L2.

The relative differences in the amounts of one or more of the Cr, Al, and Y between locations L1 and L2 can also be varied by a predetermined critical amount to provide a targeted difference in one or more given properties between the locations L1 and L2. In one example, the composition of the MCrAlY coating 64 in locations L1 and L2 with respect to the amount of Cr differs by 4-40 wt %. In a further examples of any of the examples herein, the composition of the MCrAlY coating 64 in locations L1 and L2 with respect to the amount of Al differs by up to 8 wt % and in some examples by at least 0.2 wt %. In a further examples of any of the examples herein, the composition of the MCrAlY coating 64 in locations L1 and L2 with respect to the amount of Y differs by up to 0.8 wt % and in some examples by at least 0.2 wt %.

In a further examples of any of the examples herein, the composition of the MCrAlY coating 64 in locations L1 and L2 differs with respect to an amount of Ta, W, Mo, Zr, or combinations thereof. In further examples, the composition of the MCrAlY coating 64 in one of the locations L1 or L2 includes Ta, W, Mo, Zr, or combinations thereof and the composition of the MCrAlY coating 64 in the other of the locations L1 or L2 is free of any Ta, W, Mo, Zr, or combinations thereof.

In a further examples of any of the examples herein, the composition of the MCrAlY coating 64 in locations L1 and L2 with respect to the amount of Co differs by up to 14 wt % and in some examples by at least 1 wt %.

In a further examples of any of the examples herein, the composition of the MCrAlY coating 64 in locations L1 and L2 with respect to the amount of Si differs by up to 0.55 wt % and in some examples by at least 0.1 wt %.

In a further examples of any of the examples herein, the composition of the MCrAlY coating 64 in locations L1 and L2 with respect to the amount of Hf differs by up to 0.5 wt % and in some examples by at least 0.1 wt %.

The differences in the amounts of the above elements facilitate providing a tangible property difference between the locations L1 and L2 of the MCrAlY coating 64. Table 1 below includes additional example Compositions I-IV that can be used in locations L1 and L2, as stand-alone coatings or as bond coats for overcoat 66. It is to be understood that the below-example compositions may or may not include additional impurity elements.

TABLE 1

Example Compositions I-IV

| Elements | Composition I | Composition II | Composition III | Composition IV |
|---|---|---|---|---|
| Chromium | 5.50-7.00 | 15.00-19.00 | 11.00-14.00 | 29.5-45.5 |
| Cobalt | 10.00-13.00 | 20.00-24.00 | 11.00-14.00 | 15.00-19.00 |
| Aluminum | 9.00-11.5 | 11.80-14.5 | 7.50-9.50 | 6.50-9.20 |
| Tantalum | 3.00-6.00 | | | |
| Tungsten | 3.00-6.00 | | | |
| Molybdenum | 3-Jan | | | |
| Yttrium | 0.30-0.70 | 0.40-0.80 | 0.20-0.60 | 0.25-0.75 |
| Hafnium | 0.20-0.60 | 0.10-0.40 | 0.10-0.50 | 0.10-0.40 |
| Silicon | 0.10-0.30 | 0.20-0.60 | 0.10-0.30 | 0.15-0.65 |
| Zirconium | 0.10-0.20 | | 0.10-0.20 | |
| Sulfur | 0-0.01 | 0-0.010 | 0-0.01 | 0-0.01 |
| Other Elements | 0-0.50 | 0-0.50 | 0-0.50 | 0-0.50 |
| Nickel | Remainder | Remainder | Remainder | Remainder |

Figure 3:
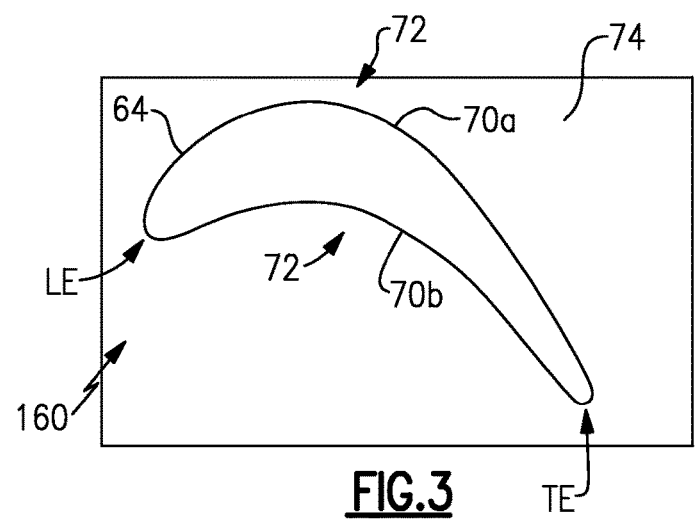
FIG. 3 illustrates a coated airfoil that can be used in the gas turbine engine of FIG. 1.

FIG. 3 illustrates another example coated article 160. In this example, the coated article 160 is an airfoil that can be used in the gas turbine engine 20. For example, the airfoil 160 can be a turbine airfoil in the turbine section 28 of the engine 20, but is not limited to turbine airfoils. In this example, the airfoil 160 includes the MCrAlY coating 64 continuously supported on the outer surface thereof. The airfoil 160 has a leading edge LE and a trailing edge TE that are joined by opposed first and second sides 70a/70b. The leading edge of the airfoil 160 can be susceptible to high temperatures and impact from foreign objects in the gas stream that flows across the surfaces of the airfoil 160. Thus, the MCrAlY coating 64 varies in composition between the leading edge of the airfoil 160 and the other locations of the airfoil 160, represented at 72, to provide better thermal resistance and erosion resistance at the leading edge relative to the other locations 72 on the airfoil 160. Similarly, the composition of the MCrAlY coating 64 can be varied to enhance corrosion, spallation resistance, fatigue, or other property of interest by location on the airfoil 160. In another example, the second side 70b can be susceptible to high temperatures, oxidation or thermal barrier coating spallation, while a platform 74 requires oxidation resistance and corrosion resistance. The MCrAlY coating 64 can varies in composition between the second side 70b of the airfoil 160 and the platform 74 to provide the desired properties in each location.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A coated article comprising:
   a substrate; and
   an MCrAlY coating supported on a surface of substrate, where the M includes at least one of nickel, cobalt, and iron, Cr is chromium, Al is aluminum, and Y is yttrium, the composition of the MCrAlY coating varying in an amount of at least one of Cr, Al, and Y by lateral location along the substrate and with respect to localized property requirements of at least one of oxidation resistance, corrosion resistance, erosion resistance, spallation resistance, creep resistance, fatigue resistance, or impact resistance.

2. The coated article as recited in claim 1, wherein the composition of the MCrAlY coating varies in the amount of Cr.

3. The coated article as recited in claim 1, wherein the composition of the MCrAlY coating varies in the amount of Al.

4. The coated article as recited in claim 1, wherein the composition of the MCrAlY coating varies in the amount of Y.

5. The coated article as recited in claim 1, wherein the MCrAlY coating includes at least one alloying element of cobalt (Co), tantalum (Ta), tungsten (W), molybdenum (Mo), silicon (Si), hafnium (Hf), and zirconium (Zr), and the amount of the alloying element differs by location on the substrate and with respect to the localized property requirements.

6. The coated article as recited in claim 1, wherein the MCrAlY coating includes at least one alloying element of tantalum (Ta), tungsten (W), molybdenum (Mo), and zirconium (Zr), and the amount of the alloying element differs by location on the substrate and with respect to the localized property requirements such that the MCrAlY includes at least one of Ta, W, Mo, and Zr at a first location on the substrate and the MCrAlY coating is free of any Ta, W, Mo, and Zr at a second location on the substrate.

7. The coated article as recited in claim 1, wherein the substrate is an airfoil, and the composition of the MCrAlY coating varies between a leading edge of the airfoil and another location on the airfoil.

8. The coated article as recited in claim 1, wherein the MCrAlY coating includes a compositional transition between a first location having a first composition and a second location having a second composition.

9. The coated article as recited in claim 1, wherein the MCrAlY coating is a continuous coating.

10. A gas turbine engine comprising:
    an article having a substrate and an MCrAlY coating supported on a surface of the substrate, where the M includes at least one of nickel, cobalt, and iron, Cr is chromium, Al is aluminum, and Y is yttrium, the composition of the MCrAlY coating varying in at least one of Cr, Al, and Y by lateral location along the substrate with respect to localized property requirements of at least one of oxidation resistance, corrosion resistance, erosion resistance, spallation resistance, creep resistance, fatigue resistance, or impact resistance.

11. The gas turbine engine as recited in claim 10, including a compressor section, a combustor in fluid communication with the compressor section, and a turbine section in fluid communication with the combustor.

12. The gas turbine engine as recited in claim 10, wherein the composition of the MCrAlY coating varies in the amount of Cr.

13. The gas turbine engine as recited in claim 10, wherein the composition of the MCrAlY coating varies in the amount of Al.

14. The gas turbine engine as recited in claim 10, wherein the composition of the MCrAlY coating varies in the amount of Y.

15. The gas turbine engine as recited in claim 10, wherein the MCrAlY coating includes at least one alloying element of cobalt (Co), tantalum (Ta), tungsten (W), molybdenum (Mo), silicon (Si), hafnium (Hf), and zirconium (Zr), and the amount of the alloying element differs by location on the substrate and with respect to the localized property requirements.

16. The gas turbine engine as recited in claim 10, wherein the MCrAlY coating includes at least one alloying element of tantalum (Ta), tungsten (W), molybdenum (Mo), and zirconium (Zr), and the amount of the alloying element differs by location on the substrate and with respect to the localized property requirements such that the MCrAlY includes at least one of Ta, W, Mo, and Zr at a first location on the substrate and the MCrAlY coating is free of any Ta, W, Mo, and Zr at a second location on the substrate.

17. The gas turbine engine as recited in claim 10, wherein the substrate is an airfoil in a turbine section of the engine, and the composition of the MCrAlY coating varies between a leading edge of the airfoil and another location on the airfoil.

18. The gas turbine engine as recited in claim 10, wherein the MCrAlY coating includes a compositional transition between a first location having a first composition and a second location having a second composition.

19. The coated article as recited in claim 1, wherein the MCrAlY coating includes at least one alloying element of tantalum (Ta), tungsten (W), molybdenum (Mo), silicon (Si), hafnium (Hf), and zirconium (Zr), and the amount of the alloying element differs by location on the substrate and with respect to the localized property requirements.

20. The coated article as recited in claim 19, wherein the substrate is an airfoil, and the amount of the at least one alloying element varies between a leading edge of the airfoil and another location on the airfoil.

21. The gas turbine engine as recited in claim 10, wherein the MCrAlY coating includes at least one alloying element of tantalum (Ta), tungsten (W), molybdenum (Mo), silicon (Si), hafnium (Hf), and zirconium (Zr), and the amount of the alloying element differs by location on the substrate and with respect to the localized property requirements.

22. The gas turbine engine as recited in claim 21, wherein the substrate is an airfoil, and the amount of the at least one alloying element varies between a leading edge of the airfoil and another location on the airfoil.

23. The coated article as recited in claim 1, wherein the MCrAlY coating includes hafnium (Hf) and the amount of the hafnium differs by location on the substrate and with respect to the localized property requirements.

24. The coated article as recited in claim 23, wherein the substrate is an airfoil, and the amount of the hafnium varies between a leading edge of the airfoil and another location on the airfoil.

\* \* \* \* \*